UNITED STATES PATENT OFFICE.

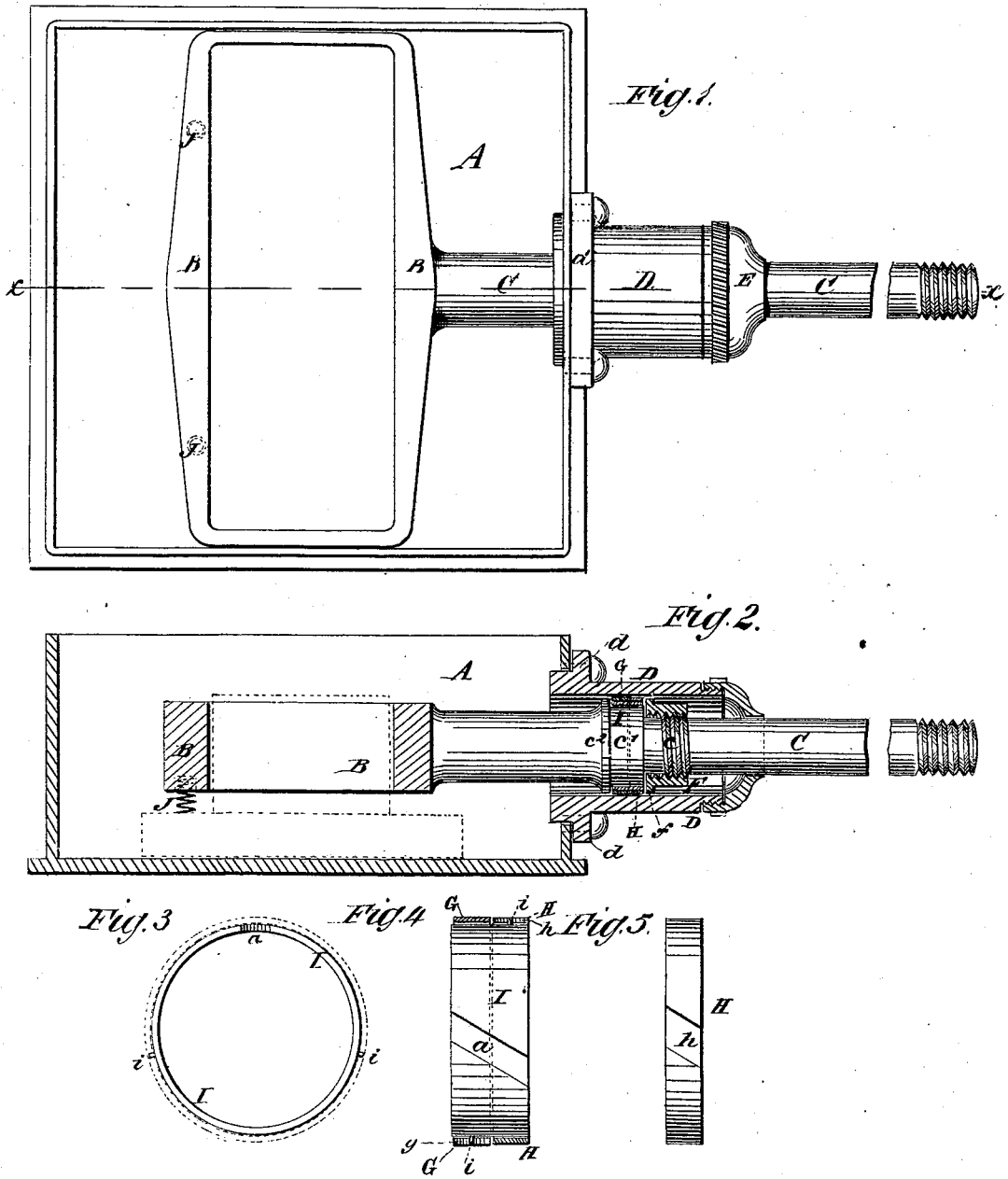

EDGAR M. LUCKETT AND NELSON BELANGER, OF TERRACE, UTAH TERRITORY.

IMPROVEMENT IN PACKING VALVE-STEMS.

Specification forming part of Letters Patent No. 207,668, dated September 3, 1878; application filed July 31, 1878.

*To all whom it may concern:*

Be it known that we, EDGAR MELVILLE LUCKETT and NELSON BELANGER, of Terrace, in the county of Box Elder and Territory of Utah, have invented a new and useful Improvement in Packing Valve-Stems, of which the following is a specification:

The object of our invention is to provide an improved mode and device for packing valve-stems, and whereby the use of glands, bushing-ring, hemp packing, &c., shall be obviated and friction reduced, while the valve-stem is exposed to no wear in the stuffing-box or its equivalent.

The invention consists in the combination of the valve-stem, provided with a nut, collar, and shoulder, the outer packing-rings arranged and held in position by pins upon the inner packing-ring, surrounding the said collar between the said nut and shoulder and the open packing-cylinder.

In the accompanying drawing, Figure 1 represents a valve-chest in which the valve-stem packing is constructed according to our invention. Fig. 2 is a vertical section on the line $x$ $x$ of Fig. 1. Figs. 3, 4, and 5 are detail views of the packing-rings.

Similar letters of reference indicate corresponding parts.

A is the valve-chest, B the valve-yoke, and C the valve-stem, of a steam-engine. D is the stuffing-box, or rather what takes the place of a stuffing-box, being a short cylinder without gland and bushing-ring, sufficiently longer than the stroke of the valve to retain the packing-rings within its inner circumference at either end of the said stroke, and provided with a flange or lug, $d$, for bolting it to the steam-chest A. The outer end of the cylinder D is covered with a screw-cap, E, surrounding the valve-stem C, to exclude dust.

The portion of the valve-stem C within the cylinder D is enlarged at $c$, and threaded to receive the flanged nut F, which keeps the packing-rings from sliding out of position by being screwed on to press with its flange $f$ against the edge of the collar $c'$, the latter being formed on the stem C, close to the threaded portion $c$, and of a larger diameter than the said portion $c$. The opposite edge of the collar $c^1$ is bordered by the annular shoulder or collar $c^2$, which is also formed upon the stem C, and of larger diameter than the collar $c^1$. The nut-flange $f$ and shoulder $c^2$ form the two sides, and the collar $c^1$ the bottom, of a groove in which the packing-rings are held upon the valve-stem.

G H I are the packing-rings. The rings G H are turned a little larger in diameter than the bore of the cylinder D, and fitted upon the inner ring, I, which also is made slightly larger than the inside diameter of the rings G H, so as to have a tendency to expand the latter as they wear.

The rings are all cut open in one place, at $a$ $g$ $h$, so as to allow of their being contracted enough to insert them in the cylinder D, and the openings $g$ $h$ of the outer rings, G H, are arranged diametrically opposite to each other on the ring I, a pin, $i$, being secured on the ring I in each of the openings $g$ $h$, to prevent the outer rings from turning upon the inner, which otherwise would cause the steam to leak through said opening should they happen to turn into a position of being in line with each other upon the same side.

The added widths of the rings G H are exactly equal to the width of the inner ring, I, which is the exact width of the collar $c^1$, and the rings are fitted with their edges steam-tight between the shoulder $c^2$ and the flange $f$.

The inner ring, I, is free to turn upon the collar $c^1$ of the valve-stem C, the latter not being exposed to wear, as it is in ordinary stuffing-boxes.

The valve-yoke B is socketed on the under side to receive spiral springs J, by which it is supported upon the flange of the steam-valve, the latter being shown in dotted lines in Fig. 2, thus preventing its weight from bearing upon the bottom of the packing-cylinder D.

Having thus described our invention, we claim as new and desire to secure by Letters Patent—

The combination of the valve-stem C, provided with the nut F, collar $c^1$, and shoulder $c^2$, the packing-rings G H I, the outer rings, G H, being arranged and held by pins $i$ in position upon the inner ring I, and the open packing-cylinder D, substantially as and for the purpose set forth.

EDGAR M. LUCKETT.
NELSON BELANGER.

Witnesses:
JNO. T. SMYTH,
WM. TAYLOR, Jr.